United States Patent [19]

Omi et al.

[11] 4,180,478
[45] Dec. 25, 1979

[54] ALKALINE EARTH HALIDE-RARE EARTH FLUORIDE PHOSPHOR

[75] Inventors: Tadao Omi, Yokohama; Minoru Watanabe, Kawasaki; Toshio Nishimura, Yokohama, all of Japan

[73] Assignee: Tokyo Shibaura Electric Co., Ltd., Kawasaki, Japan

[21] Appl. No.: 885,346

[22] Filed: Mar. 10, 1978

[30] Foreign Application Priority Data

Mar. 14, 1977 [JP] Japan ................................ 52-26960

[51] Int. Cl.$^2$ ............................................. C09K 11/46
[52] U.S. Cl. ............................................. 252/301.4 H
[58] Field of Search ................................ 252/301.4 H

[56] References Cited
U.S. PATENT DOCUMENTS

| | | | |
|---|---|---|---|
| 3,988,252 | 10/1976 | Ferretti | 252/301.4 H |
| 4,057,508 | 11/1977 | Wolfe et al. | 252/301.4 H |
| 4,075,495 | 2/1978 | Stevels et al. | 252/301.4 H X |

*Primary Examiner*—Jack Cooper
*Attorney, Agent, or Firm*—Cushman, Darby & Cushman

[57] ABSTRACT

A phosphor having a general formula;

$$nReF_3 \cdot mAfCl:Eu_x$$

where
"Re" is a rare earth element,
"A" is an alkaline earth element,
"x" is not smaller than $1 \times 10^{-4}$ and not larger than 1, and
"n/m" is not smaller than $1 \times 10^{-3}$ and not larger than $7 \times 10^{-1}$.

Further addition of samarium enables the phosphor to exhibit a decreased afterglow.

4 Claims, 5 Drawing Figures

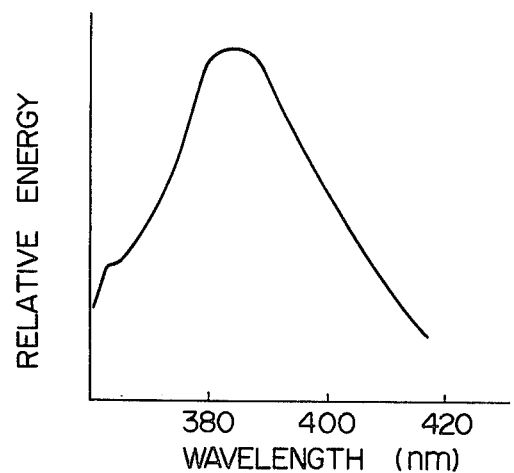
F I G. 1
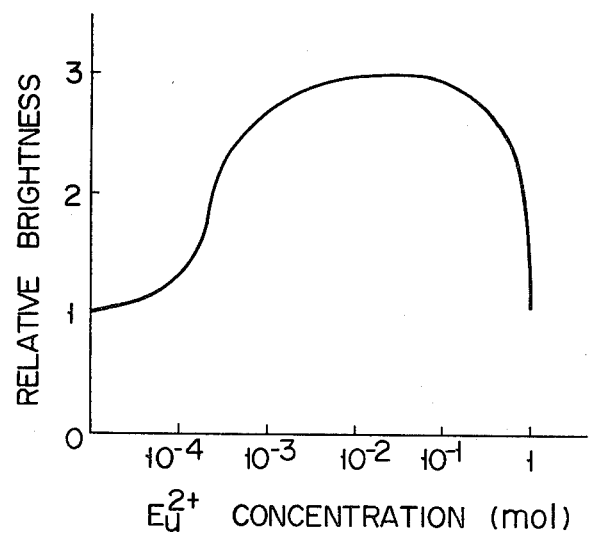
F I G. 2

ALKALINE EARTH HALIDE-RARE EARTH FLUORIDE PHOSPHOR

BACKGROUND OF THE INVENTION

This invention relates to a phosphor consisting of an alkaline earth halide and a rare earth fluoride and activated by europium.

It was customary in the past to use $CaWO_4$ as a fluorescent material for forming an X-ray intensifying screen. Further, various fluorescent materials have been proposed to date for improving the sensitivity of the X-ray intensifying screen. For example, Canadian Pat. No. 896453 discloses an alkaline earth halide phosphor such as $BaFCl:Eu$. In this phosphor, however, it is difficult to add divalent europium as an activator even if firing is carried out under neutral or reducing conditions, resulting in that the produced phosphor tends to emit light shifting a longer wavelength side because of the presence of trivalent europium. In short, the alkaline earth halide phosphor of this type is defective in that a state firing condition is difficult to determine.

SUMMARY OF THE INVENTION

An object of this invention is to provide a fluorescent material emitting light of a higher brightness than that of the light emitted by $CaWO_4$ and suitable for forming an X-ray intensifying screen and fluorescent screens for a cathode ray tube, a mercury discharge lamp, etc.

Another object is to provide a novel phosphor based on an alkaline earth halide to which is added a divalent europium as an activator.

According to this invention, there is provided a phosphor emitting light of an increased brightness and having a general formula,

$$nReF_3 \cdot mAX_2 : Eu_x \qquad (1)$$

where,

"Re" is at least one element selected from the group consisting of La, Gd, Y and Lu, "A" is at least one element selected from the group consisting of Ba, Sr and Ca, "X" is at least one element selected from the group consisting of F, Cl and Br, "x" is not smaller than $1 \times 10^{-4}$ and not larger than 1 ($1 \times 10^{-4} \leq x \leq 1$), and "n/m" is not smaller than $1 \times 10^{-3}$ and not larger than $7 \times 10^{-1}$ ($1 \times 10^{-3} \leq n/m \leq 7 \times 10^{-1}$).

Preferably, samarium is added to the phosphor of the formula (1), thereby decreasing the afterglow of the phosphor. Namely, this invention also provides a phosphor of a general formula;

$$nReF_3 \cdot mAX_2 : Eu_x \cdot Sm_y \qquad (2)$$

where,

"Re", "A", "X", "x" and "n/m" are the same as in the formula (1), and

"y" ranges between $1 \times 10^{-4}$ and $1 \times 10^{-1}$ ($1 \times 10^{-4} \leq y \leq 1 \times 10^{-1}$).

The phosphor of the formula (2) is substantially equal to that of the formula (1) in brightness of the emitted light and is lower than that of the formula (1) in afterglow.

BRIEF DESCRIPTION OF THE DRAWINGS

FIG. 1 is a graph showing the distribution curve of relative energy for the spectrum of light emitted by a phosphor of the formula (1) excited by X-ray;

FIG. 2 is a graph showing the relationship between the $Eu^{2+}$ concentration (x) and the relative brightness under X-ray excitation of a phosphor of $0.1LaF_3 \cdot 0.9BaFCl:Eu_x$;

DETAILED DESCRIPTION OF THE PREFERRED EMBODIMENTS

It is possible to add stably a divalent europium acting as an activator to a phosphor by reacting a rare earth fluoride with an alkaline earth halide providing the base material of the phosphor. As a result, the phosphor of this invention emits light of an increased brightness and is suitable for forming an X-ray intensifying screen and fluorescent screens for a cathode ray tube, a mercury discharge lamp, etc.

A phosphor of the formula (1), for example, $0.1LaF_3 \cdot 0.9BaFCl:Eu_{0.03}$ emits a strong light having a peak at about 385 nm as shown in FIG. 1. The brightness of the light under X-ray excitation reaches 5 to 6 times as high as that of the light emitted by a conventional phosphor of $CaWO_4$. When excited by ultraviolet rays having a wavelength of 2,537 Å, the brightness of the light emitting by the above-noted phosphor of this invention is 3 times as high as that of the light emitted by a conventional phosphor of $(Sr \cdot Mg)_2P_2O_7:Eu$. Further, the brightness of the light emitted by the phosphor of the formula (1) under cathode ray excitation is 3 times as high as that of the light emitted by $CaWO_4$. When excited by X-rays, even the matrix of the phosphor of the formula (1) emits light about 3 times as bright as that emitted by $CaWO_4$.

FIG. 2 shows a relative brightness under X-ray excitation with respect to the molar concentration (x) of an activator $Eu^{2+}$ for the case where $Eu^{2+}$ is added to a base material of $0.1LaF_3 \cdot 0.9BaFCl$. It is seen that the relative brightness is increased where the molar concentration of $Eu^{2+}$ ranges between $1 \times 10^{-4}$ and 1. The curve of FIG. 2 remains unchanged even if the matrix composition is varied within the scope of the formula (1). FIG. 2 clearly shows that a more preferred molar concentration of $Eu^{2+}$ per 1 mol of the matrix ranges between $1 \times 10^{-3}$ and $3 \times 10^{-1}$.

Figure 3:
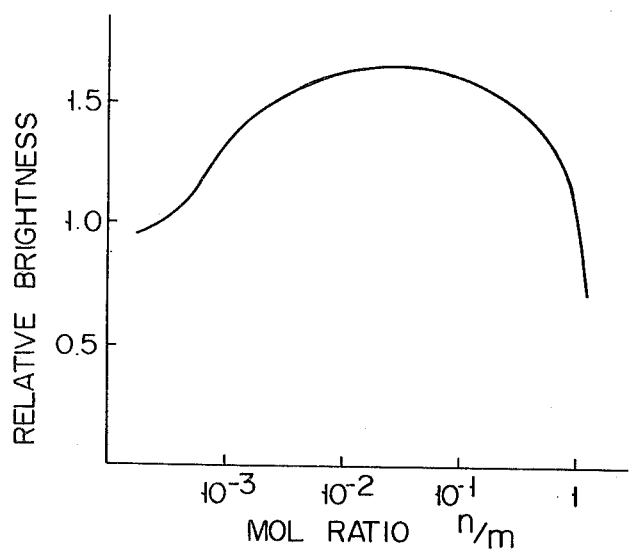
FIG. 3 is a graph showing the relationship between the molar ratio (n/m) and the relative brightness under X-ray excitation of a phosphor of $nLaF_3 \cdot mBaFCl:Eu_{0.01}$.

FIG. 3 shows a relative brightness under X-ray excitation for the case where the ratio of mols (n) of $LaF_3$ to mols (m) of $BaFCl$ is changed, with the $Eu^{2+}$ concentration set constant at, for example, $1 \times 10^{-2}$ mol. The curve of FIG. 3 remains unchanged even if the matrix composition and the $Eu^{2+}$ concentration are varied within the scope of the formula (1). FIG. 3 clearly shows that a preferred molar ratio (n/m) ranges from $1 \times 10^{-3}$ to $7 \times 10^{-1}$.

Figure 4:
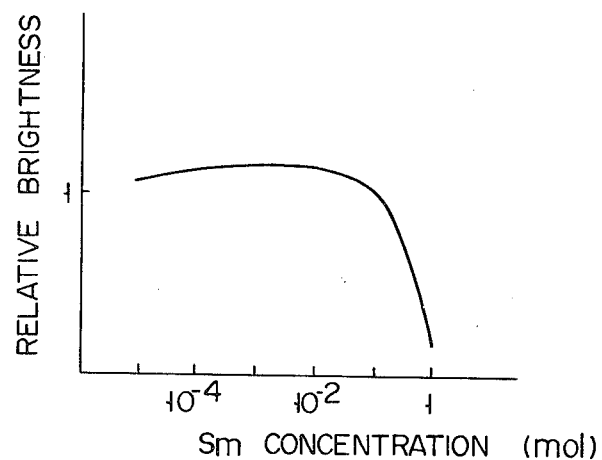
FIG. 4 is a graph showing the relationship between the Sm concentration (y) and the relative brightness under X-ray excitation of a phosphor of $0.1LaF_3 \cdot 0.9BaFCl:Eu_{0.03} \cdot Sm_y$.

A phosphor of the formula (2) is just the same as that of the formula (1) except that the former is markedly lower in afterglow than the latter. Namely, the Sm addition causes no substantial light emission of the phosphor. A phosphor of the formula (2) is lower in afterglow level than the conventional phosphor of $CaWO_4$. FIG. 4 shows a relative brightness under X-ray excitation for the case where Sm has been added to a phosphor of the formula (1), for example, $0.1LaF_3.0.9BaFCl:Eu_{0.03}$. It is seen that a preferred molar concentration of Sm relative to 1 mol of the matrix ranges from $1 \times 10^{-4}$ to $1 \times 10^{-1}$.

The phosphor of this invention can be produced by a conventional method such as hot solid phase reactions or coprecipitation of halides, followed by a heat treatment. For example, an aqueous suspension is prepared first which contains an $ReF_3$ compound, an $AX_2$ compound ("Re", "A" and "X" being the same as defined previously), a halide of Eu and, as required, a halide of Sm. The suspension has been dried at a temperature of 50 to 250° C., and then subjected to firing at 600 to 1,000° C., thereby producing the aimed product of phosphor.

The phosphor of this invention having the general formula (1) or (2) emits light having a peak at about 385 nm, high in brightness and low in afterglow and, thus, is suitable for forming an X-ray intensifying screen and flourescent screens of a cathode ray tube and a mercury discharge lamp, etc.

Figure 5:
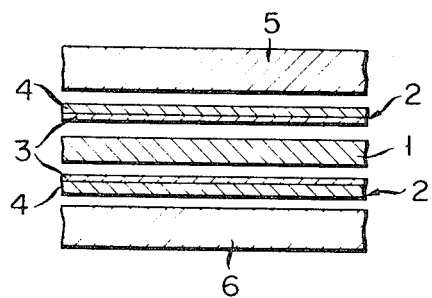
FIG. 5 is a cross sectional view of an X-ray intensifying screen mounted to a cassette of an X-ray photofilm.

FIG. 5 shows an X-ray photo cassette in which is mounted an X-ray intensifying screen. As shown in the drawing, an X-ray photofilm 1 and X-ray intensifying screens 2 disposed on both sides of the film 1 are mounted between a lid 5 and a bottom 6 of the cassette. The X-ray intensifying screen 2 comprises a substrate 4 and a layer 3 of a phosphor of this invention laminated on the substrate 4. The X-ray sensitivity of the X-ray intensifying screen is 3 times as high as that of an X-ray intensifying screen using $CaWO_4$. Where a phosphor of the formula (2) is used, the X-ray intensifying screen 2 is substantially free from afterglow.

Described in the following are Examples of this invention. Examples 1 to 12 relate to phosphors of the formula (1).

EXAMPLE 1

A mixture of $LaF_3$ (5 g), $BaF_2$ (16.5 g), $BaCl_2$ (26.5 g) and $EuF_3$ (0.5 g) was powdered and, then, subjected to firing in a quartz crucible for 1 hour at 700° to 850° C. under a reducing atmosphere like $H_2$ gas atmosphere. The resultant phosphor had a composition of $0.1LaF_3.0.9BaFCl:Eu_{0.01}$ and, when excited by X-rays of 80 KV.2 mA, emitted light having a peak at 385 nm and brightness 6 times as high as that of the light emitted by $CaWO_4$. Further, when excited by ultraviolet rays having a wavelength of 2,537 Å, the phosphor emitted light 3 times as bright as the light emitted by $(Mg.Sr)P_2O_7:Eu$. Still further, a fluorescent screen prepared by using the resultant phosphor exhibited a sensitivity 5 times as high as that of a $CaWO_2$ fluorescent screen.

EXAMPLE 2

The same procedures as in Example 1 were followed except that used was a mixture consisting of $YF_3 0.5H_2O$ (3.8 g), $BaF_2$ (16.5 g), $BaCl_2$ (26.5 g) and $EuF_3$ (0.5 g). The produced phosphor has a composition of $0.1YF_3.0.9BaFCl:Eu_{0.01}$ and, when excited by X-rays, emitted light 5 times as bright as the light emitted by $CaWO_4$.

EXAMPLE 3

A mixture of $GdF_3$ (5.3 g), $BaF_2$ (16.5 g), $BaCl_2$ (26.5 g) and $EuF_3$ (0.5 g) was powdered and, then, subjected to firing for 1.5 hours at 800° C. under a weak reducing atmosphere like a mixed gas atmosphere of $H_2$ and $N_2$. The produced phosphor had a composition of $0.1GdF_3.0.9BaFCl:Eu_{0.01}$ and, when excited by X-rays, emitted light 5 times as bright as the light emitted by $CaWO_4$.

EXAMPLE 4

An aqueous suspension was prepared first by adding $LaF_3$ (5 g) and $BaF_2$ (16.5 g) to water. Then, $BaCl_2$ (26.5 g) and $EuF_3$ (0.05 g) were dissolved in the suspension, followed by drying at 150° C. and subsequent step of firing for 1 hour at 800° C. under a reducing atmosphere. The resultant phosphor had a composition of $0.1LaF_3.0.9BaFCl:Eu_{0.001}$ and emitted light having a peak at 385 nm. The brightness of the light under X-ray excitation was 3 times as high as that of the light emitted by $CaWO_4$.

EXAMPLE 5

The same procedures as in Example 3 were followed except that used was a mixture of $LaF_3$ (14.7 g), $BaF_2$ (17.6 g), $BaCl_2$ (26.5 g) and $EuF_3$ (1.5 g). The resultant phosphor had a composition of $0.3LaF_3.0.7BaFCl:Eu_{0.03}$ and, when excited by X-rays, emitted light 2 times as bright as the light emitted by $CaWO_4$.

EXAMPLE 6

A mixture of $LaF_3$ (19.5 g), $SrF_2$ (12.5 g), $BaCl_2$ (17.5 g) and $EuF_3$ (0.6 g) was powdered and, then, subjected to firing in a quartz crucible for 1 hour at 850° C. under a weak reducing atmosphere. The resultant phosphor had a composition of $LaF_3.2(Sr_{0.5}.Ba_{0.5})FCl:Eu_{0.03}$ and, when excited by ultraviolet rays (2,537 Å in wavelength), emitted light 2 times as bright as the light emitted by $(Sr.Mg)P_2O_7:Eu$. Further, a fluorescent screen prepared by using the resultant phosphor exhibited a sensitivity 2 times as high as that of a screen prepared by using $CaWO_4$. Still further, when excited by electron beams, the resultant phosphor emitted light 4 times as bright as the light emitted by $Ca_2MgSiO_7:Ce$.

EXAMPLE 7

A mixture of $LaF_3$ (39.2 g), $CaF_2$ (2.93 g), $CaCl_2$ (6.28 g), $BaF_2$ (112 g), $BaCl_2$ (133 g), $SrF_2$ (5 g), $SrCl_2$ (6.3 g) and $EuF_3$ (6 g) was powdered and, then, subjected to firing for 1 hour at 850° C. under a reducing atmosphere. The resultant phosphor had a composition of $0.2LaF_3.0.8(Ca_{0.1}.Ba_{0.8}.Sr_{0.1})FCl:Eu_{0.03}$ and, when excited by ultraviolet rays (2,537 Å in wavelength), emitted light 2 times as bright as the light emitted by $(Sr.Mg)P_2O_7:Eu$.

EXAMPLE 8

A mixture of $GdF_3$ (42.8 g), $CaF_2$ (2.93 g) $CaCl_2$ (6.28 g), $SrF_2$ (5 g), $SrCl_2$ (6.3 g), $BaF_2$ (112 g), $BaCl_2$ (133 g) and $EuF_3$ (6 g) was powdered and, then, subjected to firing for 1 hour at 800° C. under a weak reducing atmosphere. The material thus treated was powdered again and heated for 1 hour at 750° C. under a reducing atmosphere. The resultant phosphor had a composition of $0.2GdF_3.08(Ca_{0.1}.Sr_{0.1}.Ba_{0.8}(FCl:Eu_{0.03}$ and, when excited by ultraviolet rays (2,537 Å in wavelength), emitted light 5 times as bright as the light emitted by (Sr.Mg)P$_2$O$_7$:Eu. Further, a fluorescent screen prepared by using the resultant phosphor exhibited a sensitivity 4 times as high as that of a screen using CaWO$_4$, when excited by X-rays (80 KV.2 mA).

EXAMPLE 9

A mixture of LuF$_3$ (4.26 g), BaF$_2$ (16.5 g), BaCl$_2$ (26.5 g) and EuF$_3$ (0.5 g) was powdered and, then, subjected to firing for 2 hours at 750° C. under a weak reducing atmosphere. The resultant phosphor had a composition of 0.1LuF$_3$.09BaFCl:Eu$_{0.01}$ and, when excited by X-rays, emitted light 3 times as bright as the light emitted by CaWO$_4$.

EXAMPLE 10

A mixture of LaF$_3$ (39 g), LuF$_3$ (46.2 g), BaF$_2$ (70.1 g), BaCl$_2$ (83.2 g) and EuF$_3$ (2.1 g) was powdered and, then, subjected to firing for 1 hour under a weak reducing atmosphere at 750° C. to 800° C. The resultant phosphor had a composition of 0.2(La$_{0.5}$.Lu$_{0.5}$)F$_3$.0.8BaFCl:Eu$_{0.01}$ and, when excited by X-rays, emitted light 4 times as bright as the light emitted by CaWO$_4$.

EXAMPLE 11

The same procedures as in Example 10 were followed except that used was a mixture of LaF$_3$ (17.6 g), GdF$_3$ (19.3 g), YF$_3$.0.5H$_2$O (18.6 g), BaF$_2$ (61.3 g), BaCl$_2$ (72.9 g) and EuF$_3$ (6.3 g). The resultant phosphor had a composition of 0.3(La$_{0.3}$.Gd$_{0.3}$.Y$_{0.4}$).0.7BaFCl:Eu$_{0.03}$ and, when excited by X-rays, emitted light 5 times as bright as the light emitted by CaWO$_4$.

EXAMPLE 12

The same procedures as in Example 10 were followed except that used was a mixture of YF$_3$.0.5H$_2$O (12.4 g), GdF$_3$ (25.7 g), BaF$_2$ (70.1 g), BaCl$_2$ (83.3 g) and EuF$_3$ (11.45 g). The resultant phosphor had a composition of 0.2(Y$_{0.4}$.Gd$_{0.6}$).0.8GaFCl:Eu$_{0.05}$ and, when excited by X-rays, emitted light 6 times as bright as the light emitted by CaWO$_4$.

The following Examples 13 to 24 relate to phosphors of the general formula (2).

EXAMPLE 13

A mixture of LaF$_3$ (19.5 g), BaF$_2$ (78.7 g), BaCl$_2$ (93.6 g), EuF$_3$ (2.1 g) and SmCl$_3$ (0.77 g) was powdered and, then, subjected to firing in a quartz crucible for 1 hour at 800° C. under a weak reducing atmosphere. The material thus treated was further heated for 1 hour at 850° C. under a reducing atmosphere, followed by cooling so as to obtain a phosphor of 0.1LaF$_3$.0.9BaFCl:Eu$_{0.01}$.Sm$_{0.003}$. A fluorescent screen prepared by using the resultant phosphor exhibited a sensitivity 5 times as high as that exhibited by a CaWO$_4$ screen and was lower in afterglow level than CaWO$_4$. Further, when excited by ultraviolet rays (2,537 Å in wavelength), the resultant phosphor emitted light 3 times as bright as the light emitted by (Mg.Sr)P$_2$O$_7$:Eu.

EXAMPLE 14

A mixture of YF$_3$.0.5H$_2$O (15.4 g), BaF$_2$ (78.7 g), BaCl$_2$ (93.6 g), EuF$_2$ (4.2 g) and SmCl$_3$ (1.3 g) was powdered and, then, subjected to firing in a quartz crucible for 1 hour under a weak reducing atmosphere at 700° C. to 800° C. The resultant phosphor had a composition of 01YF$_3$.0.9BaFCl:Eu$_{0.02}$.Sm$_{0.005}$ and, when excited by X-rays, emitted light 5 times as bright as CaWO$_4$. Further, the resultant phosphor was lower in afterglow level than CaWO$_4$.

EXAMPLE 15

The same procedure as in Example 3 were followed except that used was a mixture of GdF$_3$ (21.4 g), BaF$_2$ (78.7 g), BaCl$_2$ (93.6 g), EuF$_3$ (6 g) and SmCl$_3$ (1.3 g). The resultant phosphor had a composition of 0.1GdF$_3$.0.9BaFCl:Eu$_{0.03}$.Sm$_{0.005}$ and, when excited by X-rays, emitted light 5 times as bright as the light emitted by CaWO$_4$. Further, the resultant phosphor was substantially equal to CaWO$_4$ in afterglow level.

EXAMPLE 16

An aqueous suspension was prepared first by adding LaF$_3$ (19.5 g) and BaF$_2$ (78.7 g) to water. Then, BaCl$_2$ (93.6 g) was dissolved in the suspension, followed by drying at 150° C. and subsequently mixing EuF$_3$ (0.2 g) and SmCl$_3$ (0.12 g) into the dried material. Finally, the material thus treated was subjected to firing in a quartz crucible for 1 hour at 800° C. under a reducing atmosphere. The resultant phosphor had a composition of 0.1LaF$_3$.0.9BaFCl:Eu$_{0.001}$.Sm$_{0.0003}$ and emitted a strong light having a peak at 385 nm. The brightness of the light emitted by the resultant phosphor under X-ray excitation was 3 times as high as that of the light emitted by CaWO$_4$.

EXAMPLE 17

A mixture of LaF$_3$ (58.5 g), BaF$_2$ (61 g), BaCl$_2$ (73 g), EuF$_3$ (6 g) and SmCl$_3$ (1.28 g) was powdered and, then subjected to firing for 1.5 hours under a weak reducing atmosphere at 750° C. to 800° C. The resultant phosphor had a composition of 0.3LaF$_3$.0.7BaFCl:Eu$_{0.03}$.Sm$_{0.005}$ and, when excited by X-rays, emitted light 2 times as bright as the light emitted by CaWO$_4$. Further, the resultant phosphor was substantially equal to CaWO$_4$ in afterglow level.

EXAMPLE 18

A mixture of LaF$_3$ (195.5 g), SrF$_2$ (125.6 g), BaCl$_2$ (208 g), EuF$_3$ (6.3 g) and SmCl$_3$ (0.25 g) was powdered and, then, subjected to firing in a quartz crucible for 1 hour at 850° C. under a weak reducing atmosphere. The resultant phosphor had a composition of LaF$_3$.2(Sr$_{0.5}$.Ba$_{0.5}$)FCl:Eu$_{0.03}$.Sm$_{0.001}$ and, when excited by ultraviolet rays (2,537 Å in wavelength), emitted light 2 times as bright as the light emitted by (Sr.Mg)P$_2$O$_7$:Eu. A fluorescent screen prepared by using the phosphor exhibited a sensitivity 2 times as high as that exhibited by a CaWO$_4$ screen. Further, when excited by electron beams, the resultant phosphor emitted light 4 times as bright as the light emitted by Ca$_2$MgSiO$_7$:Ce.

EXAMPLE 19

A mixture of GdF$_3$ (42.8 g), CaF$_2$ (3.1 g), CaCl$_2$ (4.4 g), SrF$_2$ (5 g), SrCl$_2$ (6.3 g), BaF$_2$ (56 g), BaCl$_2$ (66 g), EuF$_3$ (6.2 g) and SmCl$_3$ (0.128 g) was powdered and, then, heated for 1 hour at 750° C. to 800° C. The material thus treated was powdered again and heated for 1 hour at 750° C. under a reducing atmosphere. The resultant phosphor had a composition of 0.2GdF$_3$.0.8(Ca$_{0.1}$.Sr$_{0.1}$.Ba$_{0.8}$)FCl:Eu$_{0.03}$.Sm$_{0.0005}$ and, when excited by ultraviolet rays (2,537 Å in wavelength), emitted light 5 times as bright as the light emitted by (Sr.Mg)P$_2$O$_7$:Eu. A fluorescent screen prepared by using the phosphor exhibited a sensitivity 4 times as high as that of a CaWO$_4$ screen, when excited by X-rays (80 KV.2 mA).

EXAMPLE 20

The same procedures as in Example 7 were followed except that used was a mixture of LaF$_3$ (39 1 g), CaF$_2$ (4.4 g), CaCl$_2$ (3.1 g), SrF$_2$ (5 g), SrCl$_2$ (6.3 g), BaF$_2$ (56 g), BaCl$_2$ (66.5 g), EuF$_3$ (6.27 g) and SmCl$_3$ (0.256 g). The resultant phosphor had a composition of 0.2LaF$_3$.0.8(Ca$_{0.1}$.Sr$_{0.1}$.Ba$_{0.8}$)FCl:Eu$_{0.03}$.Sm$_{0.01}$ and, when excited by ultraviolet rays (2,537 Å in wavelength), emitted light 2 times as bright as the light emitted by (Sr.Mg)P$_2$O$_7$:Eu.

EXAMPLE 21

The same procedures as in Example 9 were followed except that used was a mixture of LuF$_3$ (23.1 g), BaF$_2$ (87.5 g), BaCl$_2$ (104 g), EuF$_3$ (2.1 g) and SmCl$_3$ (0.077 g). The resultant phosphor had a composition of 0.1LuF$_3$.0.9BaFCl:Eu$_{0.01}$.Sm$_{0.0003}$ and, when excited by X-rays, emitted light 3 times as bright as the light emitted by CaWO$_4$.

EXAMPLE 22

A mixture of LaF$_3$ (39 g), LuF$_3$ (46.2 g), BaF$_2$ (70 g), BaCl$_2$ (83.2 g), EuF$_3$ (2.1 g) and SmCl$_3$ (0.77 g) was powdered and, then, subjected to firing for 1 hour under a weak reducing atmosphere at 750° C. to 800° C. The resultant phosphor had a composition of 0.2(La$_{0.5}$.Lu$_{Lu0.5}$)F$_3$.0.8BaFCl:Eu$_{0.01}$. Sm$_{0.003}$ and, when excited by X-rays, emitted light 4 times as bright as the light emitted by CaWO$_4$.

EXAMPLE 23

The same procedures as in Example 22 were followed except that used was a mixture of LaF$_3$ (17.5 g), GdF$_3$ (19.2 g), YF$_3$.0.5H$_2$O (18.5 g), BaF$_2$ (61.3 g), BaCl$_2$ (72.8 g), EuF$_3$ (6.27 g) and SmCl$_3$ (2.56 g). The resultant phosphor had a composition of 0.3(La$_{0.3}$.Gd$_{0.3}$.Y$_{0.4}$)F$_3$.0.7BaFCl:Eu$_{0.03}$.Sm$_{0.01}$ and, when excited by X-rays, emitted light 5 times as bright as the light emitted by CaWO$_4$.

EXAMPLE 24

The same procedures as in Example 22 were followed except that used was a mixture of YF$_3$.0.5H$_2$O (12.3 g), GdF$_3$ (30.0 g), BaF$_2$ (70 g), BaCl$_2$ (83.2 g), EuF$_3$ (10.45 g) and SmCl$_3$ (2.56 g). The resultant phosphor had a composition of 0.2(Y$_{0.4}$.Gd$_{0.6}$)F$_3$.0.08BaFCl:Eu$_{0.05}$Sm$_{0.01}$ and, when excited by X-rays, emitted light 6 times as bright as the light emitted by CaWO$_4$.

All the phosphors obtained in the above Examples fall within the scope of this invention and are suitable for forming a fluorescent screen of a low pressure mercury discharge lamp. Further, the phosphor of this invention exhibits good temperature characteristics, thereby providing an excellent fluorescent screen of a high pressure mercury discharge lamp. Still further, when excited by X-rays or cathode rays, the phosphor of this invention emits light brighter than the light emitted by the conventional phosphor and a fluorescent screen thereof presents a clear picture image.

What we claim is:

1. A phosphor having the formula;

$$nLaF_3 . mAFCl:Eu_x$$

wherein:
A is at least one element selected from the group consisting of Ba, Sr and Ca, the Eu being present in the divalent state,
x is from $1 \times 10^{-4}$ to 1, and
n/m is from $1 \times 10^{-3}$ to $7 \times 10^{-1}$.

2. The phosphor according to claim 1, wherein x is from $1 \times 10^{-3}$ to $3 \times 10^{-1}$.

3. A phosphor having a general formula;

$$nLaF_3 . mAFCl:Eu_x . Sm_y$$

wherein:
A is at least one element selected from the group consisting of Ba, Sr and Ca, the Eu being present in the divalent state,
x is from $1 \times 10^{-4}$ to 1,
n/m is from $1 \times 10^{-3}$ to $7 \times 10^{-1}$, and
y is from $1 \times 10^{-4}$ to $1 \times 10^{-1}$.

4. The phosphor according to claim 3, wherein x is from $1 \times 10^{-3}$ to $3 \times 10^{-1}$.

* * * * *